June 6, 1950     J. F. MOLTRUP     2,510,244
SUPPORT FOR SUSPENDING GARMENTS IN AUTOMOBILES
Filed April 12, 1949
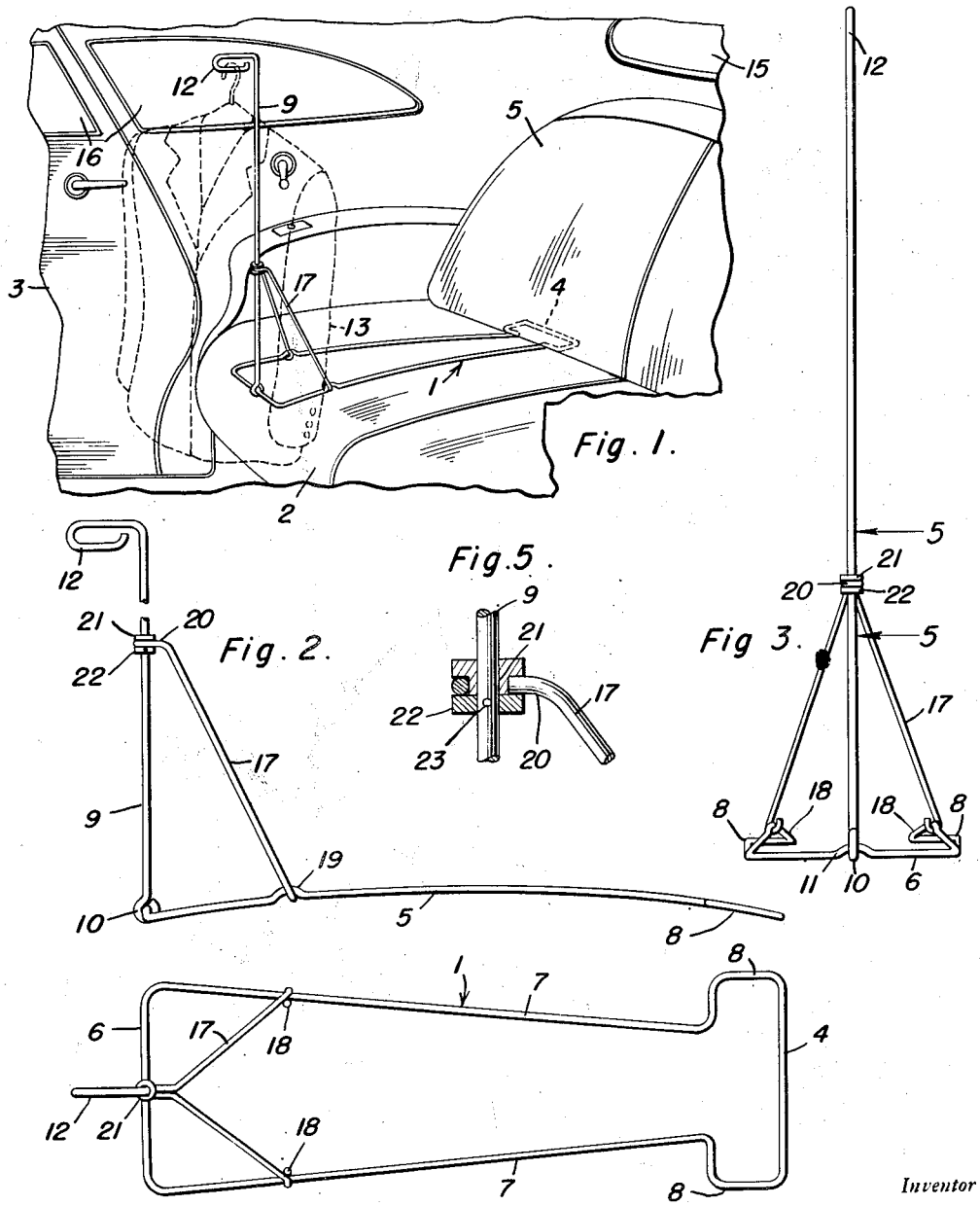
Inventor
James F. Moltrup
By Clarence A. O'Brien
and Harvey B. Jacobson
Attorneys Patented June 6, 1950

2,510,244

UNITED STATES PATENT OFFICE 2,510,244

SUPPORT FOR SUSPENDING GARMENTS IN AUTOMOBILES

James F. Moltrup, Beaver Falls, Pa.

Application April 12, 1949, Serial No. 87,028

1 Claim. (Cl. 248—121)

My invention relates to improvements in supports for suspending garments in passenger automobiles.

The primary object of the invention is to provide a support for suspending garments on hangers in passenger automobiles so that the garments will not obstruct the view of the driver forwardly or rearwardly or out of the side windows of the automobile.

Another object is to provide a support from which the garments will hang free and which does not require attaching means for securing the support in place.

Another object is to provide a device of the character and for the purpose indicated which is foldable into compact form, when not in use, for storing, or carrying, for instance in the trunk of an automobile, and which is easy to install in an automobile and remove, strong while light in weight, and inexpensive to manufacture.

Other and subordinate objects within the purview of my invention, together with the precise nature of my improvements, will be readily understood when the succeeding description and claims are read with reference to the drawing accompanying and forming part of this specification.

In said drawing:

Figure 1 is a fragmentary view in perspective illustrating my improved support, in a preferred embodiment thereof, installed in an automobile for use;

Figure 2 is a view in side elevation of the support, partly broken away, and drawn to a larger scale;

Figure 3 is a view in front elevation;

Figure 4 is a view in plan; and

Figure 5 is a fragmentary view in vertical section taken on the line 5—5 of Figure 3 and drawn to a larger scale.

Referring to the drawings by numerals, my improved support, as shown, comprises an elongated, skeleton base frame 1, preferably of rigid material, and which is adapted to be imposed flatwise on the seat cushion 2 of an automobile 3, preferably the rear seat cushion, and to extend endwise across said cushion as shown in Figure 1.

The base frame 1 is preferably bowed upwardly to fit the seat cushion 2 and is longer than the width of the seat cushion 2 to provide a rear end portion 4 for sliding under the lower edge of the back cushion 5, and a transverse front bar 6 on the frame adapted to overhang the front edge of the seat cushion 2. Preferably the sides 7 of said frame 1 taper rearwardly to laterally extending loops 8 on the rear end portion 4 for bracing the frame 1 against twisting about its longitudinal axis, while the loops 8 provide a widened rear end portion 4, which, when slid under the rear seat cushion 5, will prevent said frame 1 from tilting sidewise on the seat cushion 2.

A rod 9 is pivotally attached to the front bar 6 of said frame 1 by a lower end eye 10 on said rod fitting around a bend 11 in said bar 6 and whereby said rod 9 is swingable upwardly on said bar 6 into upright position, when in use, or downwardly to fold the same over said frame 1 when the support is not in use. A hook 12 is provided on the upper end of said rod 9 for suspending garments, or a garment, 13 on a garment hanger 14. The rod 9 is of a length such that when the same is swung into upright position on said bar 6, with the base frame 1 imposed on the seat cushion 2, said rod will not extend upwardly sufficiently for the garment 13 to obstruct the view of the driver through the rear window 15, or through the side windows 16 of the automobile.

A brace 17 of V-shape, and rod-like form, is provided for holding the rod 9 in upright position. The brace 17 is provided with resilient end hooks 18 for detachably connecting said ends, with a snap action, to bends 19 in the sides 7 of said frame 1 at a suitable point in the rear of the front bar 6, and whereby said ends of the brace 17 are detachably interlocked with the sides 7 of said frame 1 against sliding along the same, while the brace 17 is swingable on said sides 7 unto upwardly and forwardly inclined positions to brace the rod 9. The brace 17 is frictionally interlocked with the rod 9 by a lateral bight extension 20 thereon straddling and being suitably fixed to a friction collar 21 on said rod 9 adapted to be tilted when the rod 9 is upright to frictionally bind against said rod 9 when the ends of the brace 17 are attached as described.

A stop collar 22 fixed on the rod 9 below the friction collar 21, as by a pin 23, positively prevents the rod 9 from swinging forwardly out of upright position under the weight of the garment 13, or garments, suspended from the hook 12.

As will now be seen, with the rod 9 swung into upright position on the base frame 1, or front bar 6, and the ends of the brace 17 attached to the sides 7 of said frame, by snapping the hooks 18 upwardly around the bends 19, said rod will be securely held against swinging relatively to the base frame 1 and said frame may be imposed on the seat cushion 2 with its rear end portion 4 slid under the back cushion 5 to dispose the rod 9 and hook 12 forwardly of the seat cushion 2 so that the garment 13, or garments, as the case may be, will hang free between the seats of the automobile and will not obstruct the view of the driver in any way. The rear portion 4 of the base frame 1 will securely hold the support against tilting forwardly under the weight of the load thereon, or laterally, by swinging of the garment or garments. Obviously, the support may be installed on the front seat if desired to similarly support a garment, or garments, without obstructing the view of the driver through the windshield or side windows 16. A number of garments folded on garment hangers may be suspended from the hook 12, for instance, dresses.

When the support is not in use, the ends of the brace 7 may be detached from the sides 7 of the base frame 1 by releasing the hooks 18 from the bends 19, and the rod 9, together with the brace 7, may be swung down toward the base frame 1 into folded position so that the support will be folded into compact form for storage or carrying. The collar 21 is slidable on the rod 9 to permit the brace 17 to be adjusted along said rod endwise to arrange the same for compact folding.

The described support is preferably formed of substantially rigid, heavy-gauge wire, but may be formed of plastic, or any other suitable material.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described my invention, what is claimed as new is:

A support for use on an automobile seat to suspend a garment comprising an elongated skeleton base frame adapted to rest on the cushion of said seat to extend endwise across the same and having a widened rear end adapted to be inserted under the back seat cushion to hold said frame against tilting, a rod having a lower end pivoted on the front end of the frame for swinging of said rod into upright position and having an upper end suspension hook for a garment, a V-brace for holding said rod upright provided with a bight end loosely surrounding said rod, said V-brace being provided with resilient end hooks, and said frame having side bends with which said resilient hooks interlock upwardly with a snap action to connect said V-brace to said frame in inclined position to hold said rod upright, said bight having a resilient T-washer fixed therein for frictionally gripping said rod to prevent the same from swinging rearwardly out of upright position, and a stop collar on said rod for engaging said bight to prevent said rod from swinging forwardly out of upright position.

JAMES F. MOLTRUP.

REFERENCES CITED

The following references are of record in the file of this patent:

UNITED STATES PATENTS

| Number | Name | Date |
| --- | --- | --- |
| 1,082,808 | Hubbard | Dec. 30, 1913 |
| 1,457,990 | Morgan | June 5, 1923 |
| 1,542,672 | Crapo | June 16, 1925 |
| 1,590,910 | Rumrill | June 29, 1926 |
| 1,651,523 | Hamlin | Dec. 6, 1927 |